R. HUNTER.

REGISTERING DEVICE.

APPLICATION FILED JUNE 2, 1909.

Reissued Dec. 7, 1909.

13,052.

2 SHEETS—SHEET 1.

WITNESSES

F. D. Lynch

John K. Bachwogd

INVENTOR

Ross Hunter

BY Munn & Co

ATTORNEYS

R. HUNTER.

REGISTERING DEVICE.

APPLICATION FILED JUNE 2, 1909.

Reissued Dec. 7, 1909.

13,052.

2 SHEETS—SHEET 2.

WITNESSES

F. D. Sweet.

John K. Bachrach

INVENTOR

Ross Hunter

BY Munn & Co.

ATTORNEYS

UNITED STATES PATENT OFFICE.

ROSS HUNTER, OF ATLANTA, GEORGIA.

REGISTERING DEVICE.

13,052. Specification of Reissued Letters Patent. Reissued Dec. 7, 1909.

Original No. 877,430, dated January 21, 1908, Serial No. 362,312. Application for reissue filed June 2, 1909. Serial No. 499,813.

*To all whom it may concern:*

Be it known that I, Ross Hunter, a citizen of the United States, and a resident of Atlanta, in the county of Fulton and State of Georgia, have invented a new and useful Improvement in Registering Devices, of which the following is a full, clear, and exact description.

The more particular purpose of the invention is to provide a device especially adapted for temporarily holding linen or laundry work and for registering the number of pieces held by the machine.

A further purpose of the invention is so to construct the machine that the various articles may be readily placed therein one after the other, and wherein as each article is introduced into the machine a register thereof will be automatically established.

It is also a purpose of the invention to provide means whereby the articles may be quickly and conveniently released from the machine when so desired and simultaneously the registering mechanism be brought to the zero mark.

Another purpose of the invention is to provide a machine of the character described that will be very compact, simple, durable and economic, and capable of being conveniently and expeditiously operated.

Finally, the invention has for its object to provide an improved form of register and counter mechanism for registering and counting articles, or for other similar purpose, such for example, as a car-fare register or the like, in which the registering members when released return instantaneously and simultaneously to the initial, zero position, and in which the parts are so controlled that the danger of registering incorrectly is practically obviated.

It is also the object of this invention to provide a register in which the members carrying the registering figures tend gravitationally to assume initial, zero positions, and which has means operable manually or otherwise, for slidably moving the registering members.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 1:
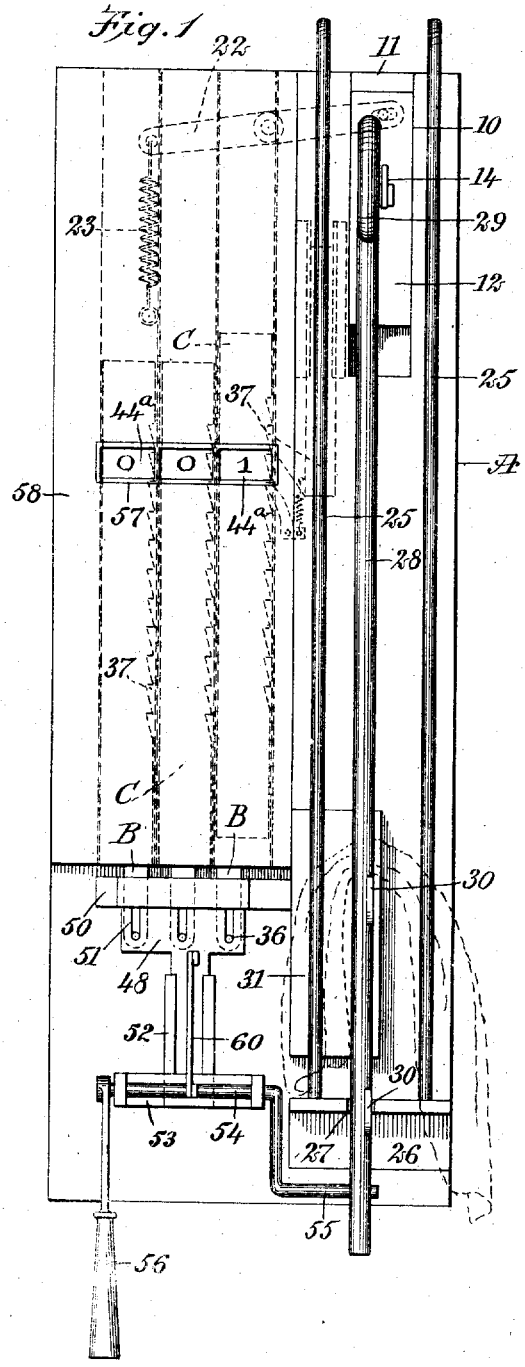
Figure 2:
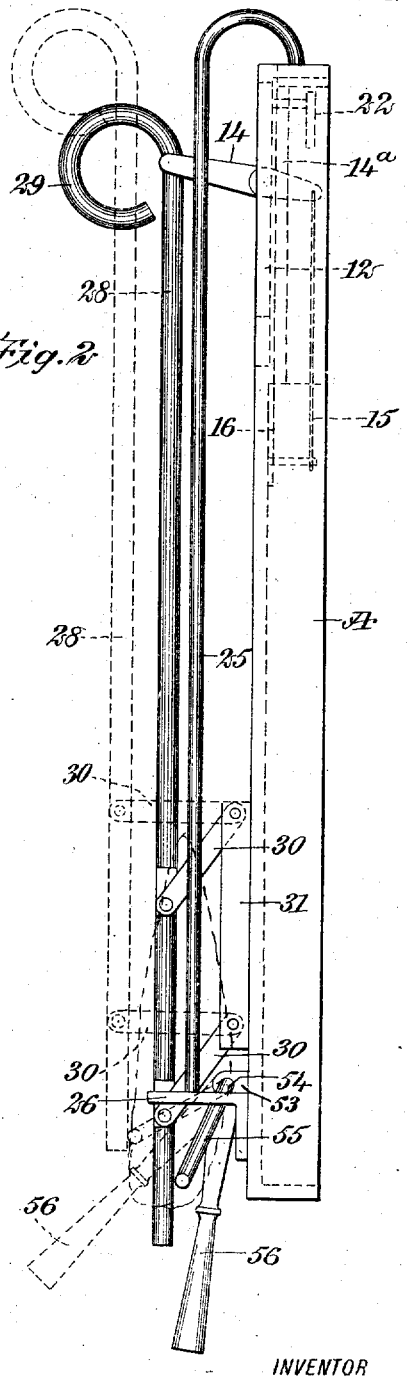
Figure 3:
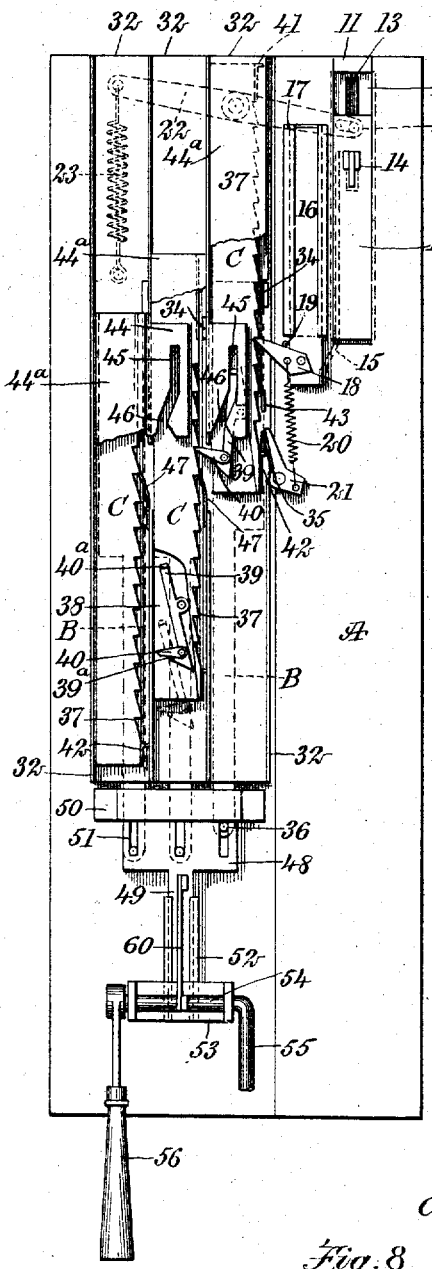
Figure 4:
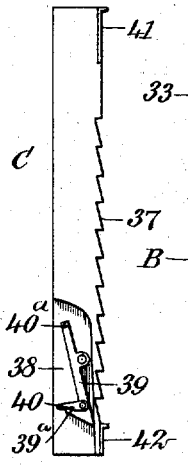
Figure 5:
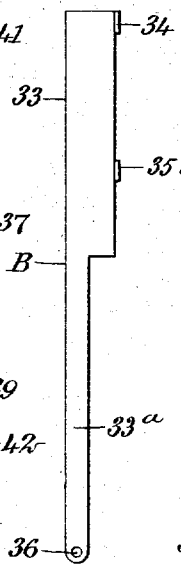
Figure 6:
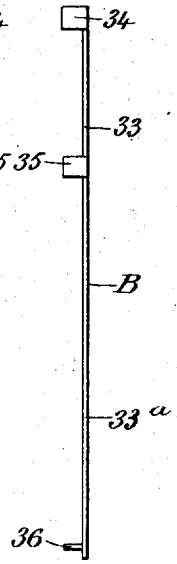
Figure 7:
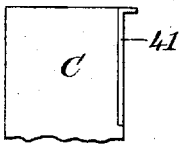
Figure 8:
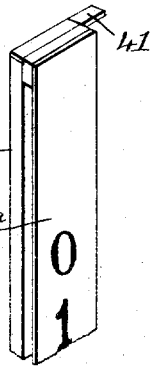

Figure 1 is a front elevation of the machine; Fig. 2 is an edge view or side elevation thereof; Fig. 3 is a front elevation of the machine with the cover plate removed and likewise the mechanism that receives the articles; Fig. 4 is a detail plan view of one of the registering bars; Fig. 5 is a plan view of a controlling slide for such a bar as is shown in Fig. 4; Fig. 6 is an edge view of the slide shown in Fig. 5; Fig. 7 is an enlarged side elevation of the upper end portion of one of the registering bars; and Fig. 8 is an enlarged perspective view of the upper part of a register bar.

I will fully describe my improved registering and counting mechanism in connection with the particular article-receiving and retaining devices, which in the embodiment of my invention have a special correlation with said improved registering and counting mechanism, but it will be understood that the registering and counting mechanism *per se* is capable of other applications.

The back or base A of the device may be of any desired character and may be made of any suitable material. At the upper right-hand corner of the said base or back A a longitudinal slot or groove 10 is produced having a stop 11 at its upper end, and in this slot or groove 10, a slide 12 is mounted for movement, and furthermore the said slot or groove 10 is provided with a longitudinal opening 13 at its upper portion below the stop 11.

A lever 14 is mounted in the slide 12 adjacent to its upper end, although the said lever may occupy another position if necessary. This lever has bearing against a wall $14^a$ which is the upper end of a slot produced in the recessed portion 10 of the back A, and when this lever is drawn downward it bears against the said upper wall $14^a$ and tends at such time to move the slide 12 in a downward direction, since the lever 14 is pivotally connected with the said slide 12, as is shown in Figs. 2 and 3. The lever 14 extends into the body A and at its rear portion is connected by a link 15 with a second slide 16 parallel to the slide 12, which slide 16 has movement in suitable guideways 17 secured upon the front face of the back A, as is particularly shown in Fig. 3. At the lower end of the said second slide 16 a dog 18 is pivotally mounted, and below the slide 16 and also below the dog 18, a pawl 21 is pivoted to the front face of the back A, and the said pawl and the said dog are connected by a spring 20, which spring acts to hold said members 18 and 21 in normal positions. The dog 18, however, is limited in its upward movement by means of a stop pin 19 that is made to extend forwardly from the back A. The slide 12 is carried normally to its upward position when released preferably in the following manner:

A lever 22 is centrally pivoted transversely at the upper portion of the back A, and this lever has a connection 24 with the slide 12 at the upper end of the latter, and the opposite end of the said lever 22 is connected with a spring 23, which spring is secured to the back A in any suitable or approved manner, as is best shown in Fig. 3, the tendency of the spring 23 being to carry the slide 12 in an upward position or to an engagement with the stop 11. The pivot pin connecting the lever 22 with the slide 12 extends through the opening 13 in the recessed portion 10 of the back heretofore referred to.

At the right side of the back A two guide rods 25 are made to extend from the bottom to the top of the said back and these guide rods pass out each side of the aforesaid slide 12, and consequently the lever 14 will be almost centrally between the said guide rods 25. The guide rods 25 are bent at their upper ends and are secured to the upper portion of the back A and are removed some distance from the forward face of said back. The guide rods at their lower ends are secured in a bracket 26 located at the lower portion of the back and the said bracket is provided with a central opening 27 in its horizontal member, since the said bracket 26 is of angular formation.

A retaining bar 28 is located between the guide rods 25, and the said retaining bar 28 is provided at its upper end with a suitable handle section 29 and at the lower portion of the said retaining bar links 30 are pivoted thereto, the said links being also pivoted to an angle plate 31 secured to the outer face of the said back A, as is particularly shown in Fig. 1, so that the said retaining bar may have parallel movement to and from the forward face of the back A and may be carried outwardly therefrom or inwardly thereto, in the latter case occupying a position practically parallel and in the same horizontal plane with the guide rods 25.

The articles to be counted are passed beneath the retaining bar and in being so passed are brought in engagement with the lever 14, operating said lever and in consequence also operating the slides 12 and 16. The articles are passed down one after the other as far as possible into a space intervening between the retaining bar 28 and the front face of the back A, and as each article is so placed in position on the device it is registered by a mechanism to be hereinafter described.

At the left of that portion of the front face of the back A occupied by the retaining bar 28 and its associated parts, channel irons are longitudinally located, which channel irons may be made of cast or wrought material, or may be made from tin or a like material. These channel irons 32 which may be more properly termed guide ways, are parallel with each other and are adjacent to each other, being preferably arranged as closely as possible. These channel guides or ways 32 are spaced in any approved manner from the front face of the back A in order to accommodate beneath them slides or shifting plates B, which slides or shifting plates, as is shown in Figs. 5 and 6, are constructed with a wide upper portion or section 33 that practically corresponds to the width of the bottom of a guide chute 32 and with a reduced lower shank 33ª that extends beyond the lower end of the guide chute beneath which the shifting plate is located, and each of the shifting plates B is provided with a forwardly extending lug 34 at one side portion of its upper end and with a second corresponding lug 35 at the same side edge, both of the lugs 34 and 35 being on the wider portions of the said shifting plates, as is shown in Figs. 5 and 6, and a forwardly extending pin 36 is located at the lower end of each slide or shifting plate B, as is also shown in Figs. 5 and 6, which pins are for a purpose to be hereinafter named.

Each channel iron or guide way is adapted to receive a registering bar C that is provided with ratchet teeth 37 in one of its side faces, as is best shown in Fig. 4, and also on the outer face of each of the registering bars C near its lower end, a recess 38 is formed, in each of which recesses a lever 39 is pivoted, and at the lower end of each lever a dog 40 is pivotally mounted, and the recesses 38 are so formed that the levers 39 can have the lower ends thrown toward the ratchet teeth 37, whereby the dogs 40 connected with the levers 39 are forced against the register bars and are rigidly held in position by stops 39ª of the levers as will appear more clearly hereinafter. At the upper end of each lever 39 for each registering bar C a head 40ª is formed that extends forwardly. At the upper end of each of the registering bars C a lug 41 is located, and a lug 42 is also located adjacent to the lower end of each of the registering bars, as is clearly illustrated in Fig. 4.

In the drawings I have shown three channel irons or guide ways 32, and the registering bar in the inital or right hand channel iron or guide way is adapted to expose units, the next tens, and the next hundreds, but I desire to be understood that any desired number of channel irons or guide ways 32 may be employed. The units or initial channel irons or guide ways 32 differ from the others in that a stationary lug 43 extends from the back A through it, as is shown in Fig. 3, and each channel iron 32 is provided with a partition 44 about centrally located, and in each of the said partitions a slot 45 is made, having an inclined lower section 46, as is shown in Fig. 3. The slots 45 act as guides to swing the levers 39 when the latter come into engagement therewith, so that the pawls 40 are operatively positioned. The inclined parts 46 of the slots displace the levers when the latter enter the slots. The ratchet teeth 37 of the registering bars C having movement in the tens and the hundreds channel irons or guide ways are adapted to be engaged by spring pawls 47, as is shown in Fig. 3; and the said channel irons or ways have suitable openings therein to permit the upward passage and the sliding movement of the lugs 34 and 35 of the sliding plates B, and also have openings therein to permit the inward passage of the dog 18 and the pawl 21, and it may be here remarked that the stationary lug 43 of the units channel iron or guide way is located between the lugs 34 and 35 of the sliding plate B that moves below the said channel irons and furthermore, the tens and the hundreds channel irons or guide ways are provided with openings through which the spring pawls 47 may extend, but it will be understood that the spring pawls 47 may be located directly within the said ways or channel irons so as to engage with the teeth 37 of the registering bars having movements therein, and I do not limit myself to any particular form of pawl for engagement with the teeth 37 of the tens and hundreds registering bars, or to any particular location for said pawls.

A plate 48 is located at the lower end portion of all of the registering bars C, and the said plate 48 is a sliding plate and is provided with a shank extension 49 and moves in a strap guide 50, and the said plate 48 is provided with a series of slots 51, each of which slots receives a pin 36 of a shifting plate B, as is also shown in Fig. 3. The shank section of the plate 48 has movement in guide-ways 52 produced upon the back A, and at the lower end of the said guides 52 a bracket 53 is located and in this bracket a shaft 54 is mounted in turn, which shaft is provided with a crank arm 55 at one end that in one movement of the shaft has lifting engagement with the retaining bar 28, and at the other end of the said shaft 54 a handle 56 is secured whereby to operate said shaft. The plate 48 and the shaft 54 have respectively, arms 48ª and 54ª pivotally connected by a link 60 so that the shaft 54 serves to operate the plate 48.

Each register bar C has secured thereto at the upper end an offset numeral plate 44ª. Each of these plates has engraved or otherwise suitably indicated thereon the numerals from naught (0) to nine (9) inclusive, and it is arranged to extend movably over the partition of the corresponding guideway 32. A cover plate 58 is mounted upon the back A over the bars C, and has sight openings 57 through which the numerals are visible.

In the operation of the device, the material is passed down between the guide rails 25 and the retaining bar 28 as has been stated, and as each piece is so passed the lever 14 is depressed. This lever 14 as it is depressed operates the slide 12 and also operates the slide 16, causing the dog 18 to have an upward movement whereby to carry the units registering bar C upward one notch to display one numeral produced thereon, and at the same time the pawl 21 engaging with the notched or toothed portion 37 of the units registering bar will prevent the said bar from dropping downward. When the units bar, for example, has been carried upward a sufficient distance to register nine at the display opening, the next movement of the said units registering bar C will cause the dog 40 carried thereby to lift the tens registering bar at the next movement of the lever 14 one notch and after the tens bar has been moved upward nine times its dog 40 will lift up the hundreds registering bar one notch so as to show at the opening, the registering of the number of pieces contained between the bars 28 and the guides 25.

When the units registering bar C reaches the limit of its upward movement, the lower lug 42 of the said units registering bar will engage with the lower lug 35 on the sliding plate below it, and will raise the said sliding plate to such an extent that the pawl 21 will be carried out of engagement with the teeth 37 of the said units registering bar, whereupon the said bar can drop to assume its normal position. But when the said bar reaches its lowest or normal position the upper lug 41 on the said bar will engage with the upper lug of the sliding plate beneath and will restore the said sliding plate to its normal position, bringing the pawl 21 again in engagement with the ratchet teeth 37 of said units registering bar. After the unit bar C has reached the limit of its upward movement, the next operation of the mechanism, it will be understood, releases the pawl 21 as explained above and this same operation releases the dog 18, as the downward movement of the slide 16 brings the dog 18 into engagement with the lug 43 and the dog is thus swung upward against the tension of the spring 20 out of engagement with the teeth of the register bar, leaving the latter free to descend gravitationally.

When it is desired to remove the material from the machine, the shaft 54 is turned so as to move the crank arm 55 beneath the retaining bar 28, lifting said bar so that, for example, napkins can be easily taken out from the machine and at the same time the plate 48 will be raised, since said plate 48 is connected with the shaft 54 by means of a link 60, and the said plate 48 will be elevated so as to bring all of the registering bars C down into their normal positions, exposing the ciphers at the opening 57 produced in the cover plate 58 as is shown in Fig. 1.

Having thus described my invention, I claim as new and desire to secure by Letters Patent:

1. In a registering device for laundry or similar articles, a supporting body, a retaining means for the articles and between which and the said body the articles are passed, the said retaining means being movable toward and from the body, and a registering device operated by the passage of the articles between the retaining means and the supporting body.

2. In a registering device for laundry or similar articles, a retaining means for the articles and a registering device operated by the passage of the articles to the retaining means, and a device for releasing the registering device and for operating the retaining means to permit the removal of the articles.

3. In a machine for registering and holding laundry and similar articles, a body section, a retaining bar, a guide bar adjacent to which the retaining bar operates, registering bars having sliding movement on the body, and means for operating the registering bars by the passage of articles between the retaining bar and the said guides.

4. In a machine for registering and holding laundry and similar articles, a body section, a retaining bar, guide bars between which the retaining bar operates, registering bars having sliding movement on the body, means for operating the registering bars by the passage of articles between the retaining bar and the said guides, and means for simultaneously lifting the retaining bar to free the articles held thereby and bring the registering bars into initial position.

5. In a laundry registering device, a body section, guide bars carried thereby, a retaining bar located between the guide bars capable of being carried to and from the body section, a lever located between the guide bars adjacent to the upper or receiving portion of the retaining bar, registering bars having numerals produced thereon, and means connected with the said lever whereby to move the registering bars step by step to expose one number after the other, the registering bars being arranged in the order of units, tens, hundreds, one registering bar having means for operating the adjoining registering bar.

6. In a laundry registering device, a body section, guide bars carried thereby, a retaining bar located between the guide bars capable of being carried to and from the body section, a lever located between the guide bars adjacent to the upper or receiving portion of the retaining bar, registering bars having numerals produced thereon, means connected with the said lever whereby to move the registering bars step by step to expose one number after the other, the registering bars being arranged in the order of units, tens, hundreds, one registering bar having means for operating the adjoining registering bar, means for carrying the retaining bar to releasing position, and simultaneously restoring the registering bars to their initial position.

7. In a machine for registering and holding laundry or similar articles, a body section provided with a guide, a retaining means having parallel movement toward and from the body section, and between which and the said guide the articles are passed, a registering device, and means for operating the registering device by the passage of the articles between the said guide and the retaining means.

8. In a machine for registering and holding laundry and similar articles, a body section, a guide carried thereby, a retaining means, movable toward and from the body section, a lever located adjacent to the receiving portion of the retaining means, and moved by the passage of the articles between the guide and the retaining means, a registering device, and connections between the said lever and the registering device for operating the latter.

9. In a machine for registering and holding laundry and similar articles, a body section, a guide carried thereby, a retaining means movable toward and from the body section, a lever located adjacent to the receiving portion of the retaining means, and moved by the passage of the articles between the guide and the retaining means, slides operated by the said lever, a registering mechanism, and means for actuating the registering mechanism by the movement of said slides.

10. A register having movable register bars tending gravitationally to maintain initial positions, means for advancing said bars successively, and means for holding said bars independently in a plurality of positions, each of said bars having a series of numbers.

11. A register having slidable register bars each having a series of numbers, an operating member for successively advancing said bars, and pawls for holding said respective bars in a plurality of positions.

12. A register having register bars free to move to return to initial zero positions, a member operable to advance said bars intermittently to effect the registering action of the device, pawls for holding said bars in a plurality of advanced positions, and shifting members controlled by said bars for releasing said pawls.

13. A register having movable register bars, tending gravitationally to maintain initial positions, means for advancing said bars successively, means for holding said bars in a plurality of advanced positions, and means for simultaneously releasing said bars from the advanced positions.

14. A register having movable register bars tending gravitationally to maintain initial positions and each having successive numbers indicated thereon, means for advancing said bars successively, means for holding said bars in a plurality of advanced positions, means for simultaneously releasing said holding means, and means on said bars for rendering said holding means operative after said bars have returned to their initial positions.

15. A register having a register bar tending gravitationally to maintain an initial position, means for advancing said bar in steps, means for holding said bar in a plurality of advanced positions, means on said bar for rendering said holding means inoperative, means on said bar for rendering said holding means operative, and means independent of said bar for rendering said holding means inoperative.

16. A register having register bars, means for intermittently advancing the first of said bars, and means for advancing another of said bars through the movement of said first bar, said last mentioned means being inoperative until said first bar reaches a predetermined position, said bars tending gravitationally to assume initial, zero positions.

17. A register having register bars, means for intermittently advancing the first of said bars, means for advancing others of said bars through the movement of said first bar, means for holding said last mentioned advancing means inoperative until said first bar reaches a predetermined position, said last mentioned means being released by said first bar, and means for holding said bars in a plurality of advanced positions, said bars tending gravitationally to return from the advanced positions to initial, zero positions.

18. A register having register bars free to move to return to initial, zero positions, means for intermittently advancing said bars to effect the registering action of the device, means for holding said bars in a plurality of advanced positions, and means controlled by said bars, for releasing said holding means.

19. A register having a plurality of successive register bars, means for intermittently advancing the first of said register bars, said first register bar controlling said successive register bars, means for holding said register bars in a plurality of advanced positions, said register bars being free to move to return to initial, zero positions and controlling said holding means, and means independent of said bars, for simultaneously releasing all of said bars from advanced positions.

20. A register having a casing, register bars, means for guiding said bars whereby they are free to move longitudinally and to return to initial, zero positions, dogs adapted to engage said bars to hold the same in a plurality of positions, means for intermittently and successively advancing said bars, said bars having means for inoperatively disposing said dogs when said bars reach predetermined positions, means for holding said dogs inoperative, and means on said bars for releasing said holding means when said bars reach predetermined positions.

21. A register having a units register bar, means for intermittently advancing said bar, a tens register bar, and mechanism adapted to operate said tens bar and controlled by said units bar, said mechanism being normally inoperative and being rendered operative by said units bar when the same reaches a predetermined position.

22. A register having a units register bar, means for intermittently advancing said bar, successive register bars, and instrumentalities, each controlling a successive bar and each operable by another bar, said instrumentalities being normally inoperative and being rendered operative when said bars controlling them reach predetermined positions.

23. A register having register bars free to move to return to initial, zero positions, means for intermittently advancing said bars to effect the registering action, means for holding said bars in a plurality of advanced positions, means controlled by said bars for releasing said holding means, and instrumentalities each adapted to operate one of said bars and controlled by another of said bars, said instrumentalities being normally inoperative, and being rendered operative by said bars controlling them when the same reach predetermined positions.

24. A register, having slidable register bars tending gravitationally to maintain initial positions, an operating slide for advancing said bars successively, pawls for holding said bars in a plurality of advanced positions, and shifting plates each controlled by one of said bars and operable to release said pawls, said shifting plates being simultaneously operable independently of said bars.

25. A register having register bars, a slide for intermittently advancing the first of said bars, and a dog carried by the first of said bars and serving to advance another of said bars, said dog being inoperative until said first bar reaches a predetermined position, said bars tending gravitationally to assume initial, zero positions.

26. A register, comprising slidable register bars, an operating slide for intermittently advancing the first of said bars, a member pivotally carried by said first bar and having a dog adapted to advance the second of said bars, and a guide adapted to engage said member operatively to position said dog when said bar carrying said member reaches a predetermined point.

27. A register, comprising slidable register bars, an operating slide for intermittently advancing the first of said bars, a member pivotally carried by said first bar and having a dog adapted to advance the second of said bars, a guide adapted to engage said member operatively to position said dog when said bar carrying said member reaches a predetermined point, pawls for holding said bars in a plurality of positions, and members controlled by said bars for displacing said pawls into inoperative positions when said bars reach predetermined points, whereby said bars become free to return to their initial, zero positions.

28. A register, having slidable register bars, an operating slide for intermittently advancing the first of said bars, a member pivoted upon said first bar and having a dog adapted to engage the second of said bars to advance the same, a slotted partition adapted to engage said member when said first bar reaches a predetermined point, operatively to position said dog, shifting plates each controlled by one of said bars, pawls serving to hold said bars in a plurality of positions, said shifting plates being adapted to displace said pawls from engagement with said bars, and a member for simultaneously operating said shifting plates to release said pawls.

29. A register, comprising slidable register bars, an operating slide for intermittently advancing the first of said bars, said first bar having a movable dog for advancing the second of said bars, a partition having means for guiding said dog into an operative position, and a numeral plate carried by said first bar and extending movably over said partition, said numeral plate having numbers indicated thereon.

30. A register having guideways, register bars slidably mounted in said guideways, an operating slide for intermittently advancing the first of said bars, said bars, with the exception of the last of said bars, each having a pivoted lever, dogs carried by said levers, said levers having stops adapted to limit the movement of said dogs in one direction, said guideways having partitions provided with guide slots and adapted to be engaged by said respective levers, whereby said dogs are operatively positioned when said bars reach predetermined positions, shifting plates, said bars being adapted to raise said plates when said bars reach predetermined positions, and pawls adapted to hold said bars in a plurality of positions, said shifting plates when raised serving to release said pawls, said bars when returning to initial positions engaging said shifting plates to return said plates to initial positions.

31. A register having guideways, register bars slidably mounted in said guideways, an operating slide for intermittently advancing the first of said bars, said bars, with the exception of the last of said bars, each having a pivoted lever, dogs carried by said levers, said levers having stops adapted to limit the movement of said dogs in one direction, said guideways having partitions provided with guide slots and adapted to be engaged by said respective levers, whereby said dogs are operatively positioned when said bars reach predetermined positions, shifting plates, said bars being adapted to raise said plates when said bars reach predetermined positions, pawls adapted to hold said bars in a plurality of positions, said shifting plates when raised serving to release said pawls, said bars when returning to initial positions engaging said shifting plates to return said plates to initial positions, a member for simultaneously raising said shifting plates independently of said bars, said shifting plates being adapted to be raised independently of said last-mentioned member, and numeral plates each carried by one of said bars and offset above said partitions, said numeral plates having numerals indicated thereon.

32. A register having a slidable register bar, a pawl for holding said bar in a plurality of positions, a shifting plate having separated lugs, one of said lugs being adapted to engage said pawl to displace the same when said shifting plate is moved, said bar having a part adapted to engage said plate to move the same when said bar reaches a predetermined position, said bar having a further part adapted to engage one of said lugs to return said shifting plate to its initial position when said bar returns to its initial position, and a slide for intermittently advancing said bar.

33. A register having slidable register bars, an operating slide, a dog carried by said slide and adapted to engage the first of said bars to advance the same as said slide is operated, a lug adapted to dispose said dog inoperatively when said slide moves in one direction, and a pawl for holding said first bar in a plurality of positions, said bars each controlling the next adjacent bar.

34. A register having an initial register bar arranged to slide, an operating slide, a dog pivotally carried by said slide and adapted to engage said bar to advance the same intermittently, a pawl for holding said bar in a plurality of positions, a spring tending to hold said dog and said pawl in normal positions, and a shifting plate, said shifting plate being controlled by said bar and being adapted to release said pawl when said bar reaches a predetermined position.

35. A register having guideways, register bars arranged to slide in said guideways and having teeth, said bars tending gravitationally to assume initial positions, an actuating slide having a dog for operating the first of said bars, and a pawl for holding said first bar in a plurality of positions, shifting plates, one of said plates controlling said pawl to release the same, said bars controlling said shifting plates, said first bar having means for operating said second bar.

36. A register having guideways, register bars arranged to slide in said guideways and having teeth, said bars tending gravitationally to assume initial positions, an actuating slide having a dog for operating the first of said bars, a pawl for holding said first bar in a plurality of positions, shifting plates, one of said plates controlling said pawl to release the same, said bars controlling said shifting plates, said first bar having a lever carrying a dog adapted to engage said second bar to operate the same when said lever is in a predetermined position, said guideway of said second bar having a partition presenting a slot adapted to guide said lever into the predetermined position, and a pawl for holding said second bar in a plurality of positions, said shifting plate controlled by said second bar being adapted to render said last-mentioned pawl inoperative.

In testimony whereof I have signed my name to this specification in the presence of two subscribing witnesses.

ROSS HUNTER.

Witnesses:
VERNER C. KRENTER,
R. A. WILLSON.